United States Patent [19]

Bien

[11] Patent Number: 5,098,765
[45] Date of Patent: Mar. 24, 1992

[54] FASTENING ARRANGEMENT FOR PLASTIC VEHICLE PANEL

[75] Inventor: Alfred A. Bien, West Bloomfield, Mich.

[73] Assignee: Chrysler Corportion, Highland Park, Mich.

[21] Appl. No.: 455,650

[22] Filed: Dec. 22, 1989

[51] Int. Cl.$^5$ .......................... B32B 3/10; B60J 7/00; F16B 35/04
[52] U.S. Cl. .................................. 428/134; 428/136; 428/137; 428/156; 411/339; 411/368; 411/427; 411/544; 403/408.1; 296/191; 296/193; 293/155
[58] Field of Search ................. 428/65, 137, 156, 134, 428/136, 129, 192; 403/408.1; 411/427, 908, 907, 339, 368, 544; 293/115; 296/187, 191, 193, 198, 901; 24/297; 29/33.2

[56] References Cited

U.S. PATENT DOCUMENTS 4,592,937 6/1986 Magato et al. .................. 428/31
4,792,475 12/1988 Bien ................................. 428/65

Primary Examiner—Patrick J. Ryan
Assistant Examiner—Donald J. Loney
Attorney, Agent, or Firm—Edward P. Barthel

[57] ABSTRACT

The present invention relates to an arrangement for attaching a plastic panel to an automotive body metal substructure enabling controlled distortion free thermal expansion and contraction of the plastic panel relative to a metal substructure. The attaching arrangement comprises a plastic adjustable mounting block sized for initial insertion in an associated wide slot portion of a keyhole-shaped expansion and contraction slot. The block has a central abutment portion depending from an upper plate portion including lateral extending wings providing with the plate opposed grooves adapted to slidably engage a narrow trailing slot portion of the keyhole-shaped slot upon the blocks subsequent longitudinal rearward movement. The block has a vertically disposed longitudinally extending integral locating frangible finger extending longitudinally from the abutment portion adapted to engage the rearward transverse edge of the narrow slot portion allowing the precisely located block to be readily affixed by a fastener to the plastic panel. Upon the panel undergoing shrinkage the narrow slot portion transverse edge crushes the locating finger enabling the plastic panel and its associated blocks to slide fore and aft relative to the substructure to accommodate thermal movement of the panel.

2 Claims, 4 Drawing Sheets

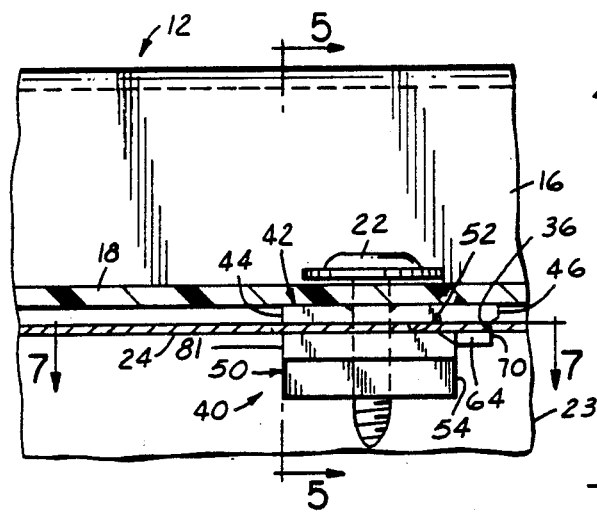
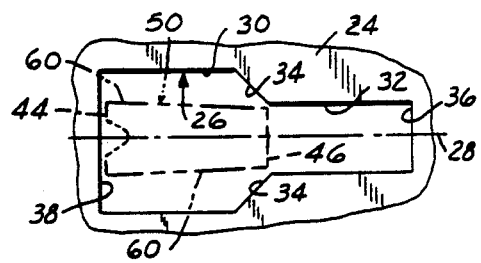
FIG.3A
FIG.4
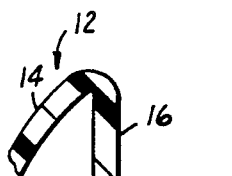
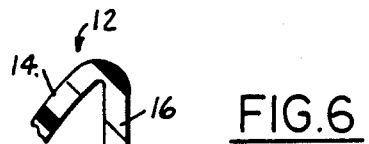
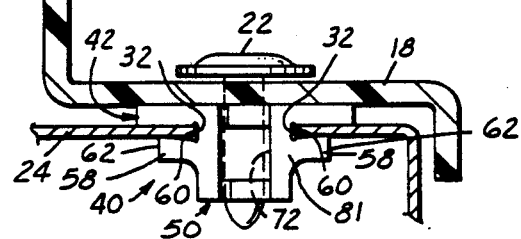
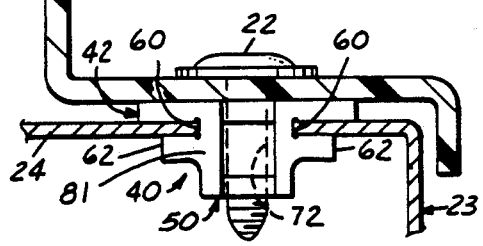
FIG.5    FIG.6
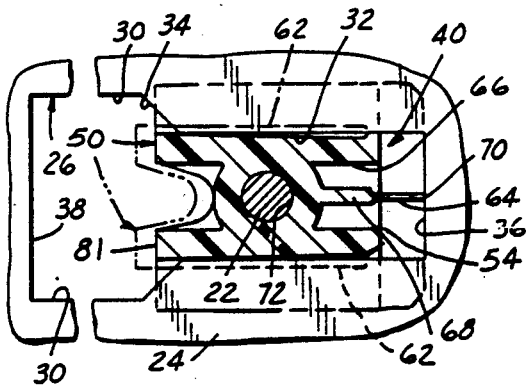
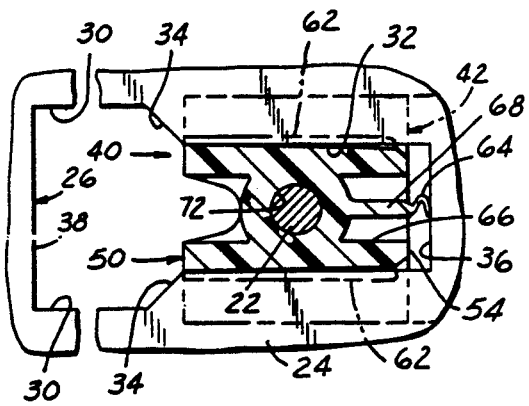
FIG.7    FIG.8

FASTENING ARRANGEMENT FOR PLASTIC VEHICLE PANEL

This invention relates generally to a fastening arrangement for securing an elastomeric or plastic panel to a metal substructure portion of an automotive vehicle body and more particularly to such a fastening arrangement which allows for thermal distortion-free expansion and contraction movement of the plastic panel relative to the substructure.

BACKGROUND OF THE INVENTION

Various arrangements have heretofore been used for securing elastomeric parts to metal portions of motor vehicles. One such arrangement is found in the U.S. Pat. No. 4,792,475 issued Dec. 20, 1988 to Alfred A. Bien entitled Composite Joint Pad For Synthetic Resin Panels. The '475 patent discloses a mounting arrangement and method of manufacture for clamping synthetic resin panels to a workpiece such as a vehicle metal substructure. A composite joint pad has a plate-like metal bushing pre-molded therein. The bushing comprises a raised central embossment having an exposed portion terminating in an arcuate sectioned rim extremity positioned a predetermined distance outwardly from the bonding face of the pad. Upon the bushing exposed embossment being received in a panel aperture, the pad's face is bonded to a panel mating surface with the rim flush with an adjacent surrounding surface of the panel. As a result, the pad's arcuate sectioned rim is clamped to the substructure by means of a threaded fastener being overdriven in the bushing stem without causing stress on the panel.

The U.S. Pat. No. 4,592,937 issued June 3, 1986 to Nagata et al. entitled Arcuate Side Molding discloses an arcuate resin plate side molding of a vehicle adapted to be attached to a curved surface of an automobile metal body avoiding holes being formed therein. The thermal expansion coefficient of the side molding is different from that of the automobile body. Therefore, the direct attachment of the molding to the metal body results in thermal deformation of the molding relative to the body, for example, in a hot day in summer. In the Nagata, et al. patent the molding comprises a resin plate having projections formed in the backside thereof, and an intermediate member provided with slots for receiving the projections of the resin plate. In assembling the resin plate and the intermediate member, the projections are inserted through the slots of the intermediate member, and then the tips of the projections are heat caulked to join the intermediate member to the resin plate. In this way the resin plate and the intermediate member are longitudinally slidable relative to each other.

The U.S. Pat. No. 4,597,153 issued July 1, 1986 and U.S. Pat. No. 4,597,153 issued July 16, 1986 to common inventor W. S. Zaydel disclose a method for mounting a plastic body panel on a vehicle underlying metal substructure together with the mounting structure therefore. The Zaydel patents disclose a fastener fixedly attaching one end portion of the plastic panel on the metal structure. A mounting block is slidably mounted on the metal substructure longitudinally spaced from the fastener to define a path of longitudinal movement of the mounting block toward and away from the fixed end portion of the plastic panel. A spring urges the mounting block to a certain longitudinal position and is yieldable to permit movement of the mounting block away from the certain longitudinal position. A fastener attaches the plastic panel to the mounting block so that the plastic panel is effectively supported in a manner enabling longitudinal movement relative to the fixed one end portion to accommodate thermal or hygroscopic growth of the plastic panel.

The U.S. Pat. No. 3,875,661 issued Apr. 8, 1975 to Lindstrom et al. discloses a flexible subassembly for installation on a vehicle body. The Lindstrom subassembly includes a flexible elastomeric panel having a peripheral contour corresponding to a similar peripheral contour on the body, a plurality of square bosses on a mounting surface of the flexible panel, a rigid reinforcing panel disposed in juxtaposition with the mounting surface, and a plurality of apertures in the reinforcing panel corresponding to the bosses. Each aperture is larger than the corresponding boss in a direction parallel to the peripheral contour so that thermal expansion and contraction of the flexible panel is directed along the peripheral contour thereby to assure a continuous contour across the interface between the flexible panel and the body.

The U.S. Pat. No. 4,564,232 issued Jan. 14, 1986 to Fujimori et al. discloses an automobile door with an inner plate and an outer plate wherein the outer plate has a panel formed from a synthetic resin. The panel is attached to a rigid metallic plate, such as steel, through a plurality of fastening holes formed in the longitudinal direction of the synthetic panel. One of the fastening holes near the forward end of the panel has a diameter substantially that of the fastening means. The remaining fastening holes are formed so as to allow longitudinal expansion and contraction of the synthetic panel. A lip portion is formed near the lower edge of the synthetic panel to engage with the inner plate of the door.

The U.S. Pat. application Ser. No. 07/437,243 filed Nov. 16, 1989 now U.S. Pat. No. 4,973,102 issued Nov. 27, 1990, entitled "Fastening Arrangement For Plastic To Metal Parts", invented by Alfred A. Bien, and assigned to the assignee of the instant application. The Bien application discloses an improved arrangement for attaching a plastic panel and metal mounting strip subassembly to an automotive body metal substructure enabling controlled distortion free thermal expansion and contraction of the plastic panel relative to the mounting strip. The attaching arrangement comprises a metal spacing washer having a tubular sleeve portion formed with an integral frusto-conical spring flange. The washer sleeve portion free end extends through an elongated slot in the mounting strip and an aligned circular opening in the panel. A blind break-stem rivet is inserted through the washer bore and upon being set applies a predetermined axial clamping force biasing the washer flange into contact with the mounting strip. The rivet head undersurface may be provided with an annular locking ring adapted to engage the plastic panel outer surface. Upon the panel being heated to its thermal-relaxation temperature the locking ring is embedded in the softened plastic panel thereby reducing excess load on the washer spring flange in a tolerance self-compensating manner.

SUMMARY OF THE INVENTION

A primary object of the present invention is to provide an attaching arrangement for initial precise positioning of a plastic panel to a metal substructure of an automobile body along which the plastic panel may subsequently self-adjust by sliding relative to the metal substructure because of the different thermal expansion and contraction characteristics between the panel and the substructure.

It is still another object of the present invention to provide an attaching arrangement as set forth above wherein a plurality of slidable plastic mounting blocks are received in associated aligned keyhole-shaped cutouts or slots in a metal substructure whereby screw fasteners removably attach a plastic panel to each of the mounting blocks enabling the plastic panel and blocks to move conjointly longitudinally relative to vehicle body metal substructure accommodating both thermal expansion and contraction of the plastic panel.

A still further object of the present invention is to provide an attaching arrangement as set forth above wherein each block having a frangible positioning finger adapted in its unyielding state to contact one transverse edge of its associated keyhole-shaped slot whereby the finger initially precisely positions its associated block on the metal substructure for ready attachment of a plastic panel by suitable fasteners while the finger being sufficiently weak in response to a compressive force being applied by the slot transverse edge providing a subsequent crushed state thereby enabling the block to slide in one direction to compensate for thermal contraction of the panel.

The present invention discloses an arrangement for attaching long, thin sectioned plastic or synthetic panels such as a fender, for example, to a vehicle body metal substructure accommodating longitudinal expansion and contraction of the panel in a distortion or warpage free manner. A plurality of adjustable plastic or synthetic mounting blocks are provided for slidable reception in associated keyhole-shaped slots in the substructure. The mounting blocks comprise an upper rectangular plate portion having a width greater than the wide slot portion of a keyhole-shaped slot. The plate portion has a lower central abutment portion depending form the undersurface of the plate and sized for snug reception in the narrow slot portion of the keyhole-shaped slot. The abutment portion has its trailing transverse edge recessed a predetermined longitudinal distance from the trailing edge of the plate portion.

The abutment portion is formed with a pair of laterally extending wings vertically spaced from the plate portion undersurface to define a pair of opposed grooves adapted to slidably receive associated side edges of the narrow slot portion such that the span of the wings is less than the width of the wide slot portion but greater than the width of the narrow slot portion. A vertically disposed integral frangible locating finger extends rearwardly from the abutment portion with its free end located just short of the plate's trailing edge. The finger is aligned in the vertically disposed longitudinally extending plane of symmetry of the mounting block such that its trailing free end is adapted to abut the closed transverse edge of the narrow slot portion to initially precisely position or index the block on the body substructure during a vehicle assembly line plastic panel mounting operation of the vehicle.

A plurality of the mounting blocks, each having a vertical bore therethrough, are located in their indexed position in an associated one of a plurality of longitudinally aligned keyhole-shaped slots spaced along a portion of the vehicle substructure. To attach the panel a worker simply aligns the plurality of fastening holes in the plastic panel with respective underlying ones of the block bores and secures the panel by inserting screws through the aligned holes. The panel has one fastening hole near its rearward end which is aligned with a reference hole in the vehicle substructure. Upon receiving an anchoring screw through the panel fastening hole and the reference hole the plastic panel, together with its mounting blocks, is free to longitudinally expand away from and contract towards the vehicle substructure reference hole to accommodate thermal expansion and contraction.

The vehicle is designed to withstand service temperatures ranging from −40° to 180° F. Thus, during sub-zero temperatures the plastic panel undergoes shrinkage or contraction causing each block indexing finger free end to be subjected to a compressive force by its associated keyhole-shaped slot transverse abutting edge. The frangible finger is sufficiently weak such that, upon a compressive force exceeding each finger's predetermined rigid and non-yielding state, the finger is crushed in its yielding deformable state enabling the panel and its blocks to move toward the anchoring screw. That is, each mounting block is free to slide rearwardly a required distance in its narrow slot portion whereby its closed edge deforms a corresponding segment of the frangible finger so as not to obstruct any shrinkage movement of the panel relative to the substructure.

BRIEF DESCRIPTION OF THE DRAWINGS

FIG. 3A is a view similar to FIG. 3 showing the keyhole slot and a portion of the mounting block in its initial installation position;

FIG. 4 is a fragmentary side elevational view, partly in longitudinal section, of the mounting block of FIG. 3;

FIG. 5 is an enlarged fragmentary transverse vertical sectional view taken substantially on the line 5—5 of FIG. 4 prior to tightening the threaded fastener;

FIG. 6 is a view similar to FIG. 5 after tightening the threaded fastener;

FIG. 7 is an enlarged fragmentary horizontal sectional view taken on the line 7—7 of FIG. 4;

FIG. 8 is a view similar to FIG. 7 showing the mounting block after undergoing contraction;

DESCRIPTION OF THE PREFERRED EMBODIMENTS

Figure 1:
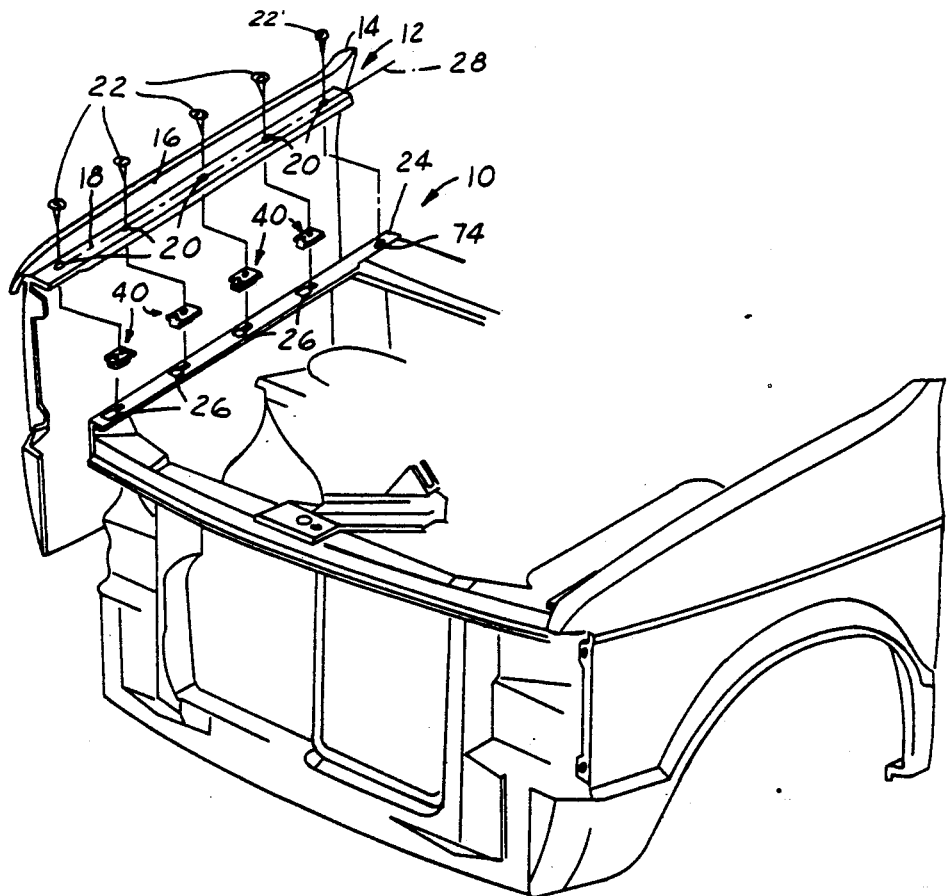
FIG. 1 is a fragmentary exploded perspective view of a vehicle frame substructure showing an arrangement for mounting a front plastic fender thereto in accordance with the present invention.
Figure 2:
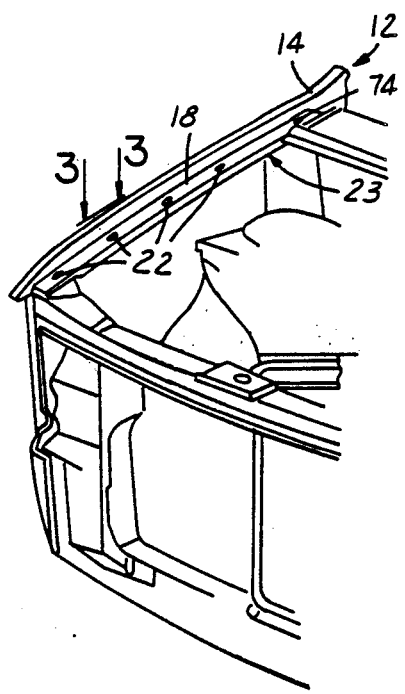
FIG. 2 is a fragmentary exploded perspective view of a vehicle frame structure showing a improved arrangement for mounting a front elastomeric fender on the metal frame.

Turning now to the drawings, FIG. 1 shows a perspective view of a front portion of a vehicle body frame 10 adapted to receive a plastic panel member which in the disclosed embodiment is a front fender, generally indicated at 12. The fender 12 is formed from a suitable elastomeric or plastic material comprising an arcuate exterior portion 14 and an L-shaped integral angle portion comprising a vertical panel 16 and a horizontal panel portion 18. The horizontal panel portion has a plurality of longitudinally aligned uniformly spaced fastening holes 20 each adapted to receive respective self tapping threaded screw fasteners 22.

The horizontal panel portion 18 is sized for flush reception on a metal planar portion of the vehicle frame substructure generally indicated at 23. In the disclosed form the substructure planar portion is a horizontal sheet metal flange 24 formed or lanced with a plurality of expansion and contraction keyhole-shaped slots 26. As best seen in FIGS. 4, 5 and 6, the plastic fender 14 integral planar attachment panel 18 has a plurality of spaced uniform circular openings 20 aligned on a common longitudinal axis 28. The plurality of the circular openings 20 are each adapted for alignment with an associated one of the plurality of keyhole-shaped slots 26 formed in the flange 24 of the metal substructure 23.

Figure 3:
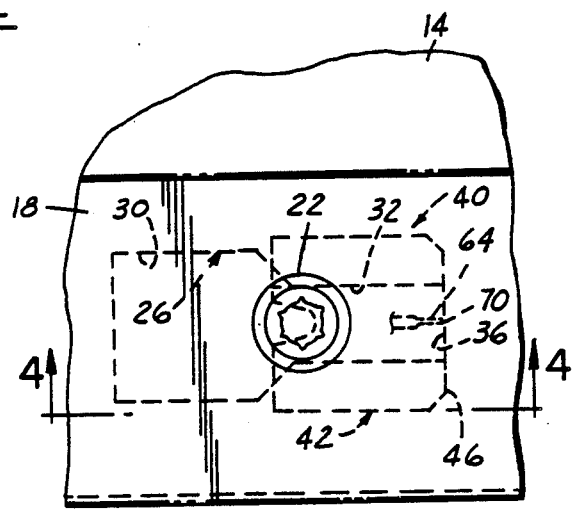
FIG. 3 is a fragmentary top elevational view of the elastomeric fender fixedly mounted on the vehicle body metal substructure.
Figure 9:
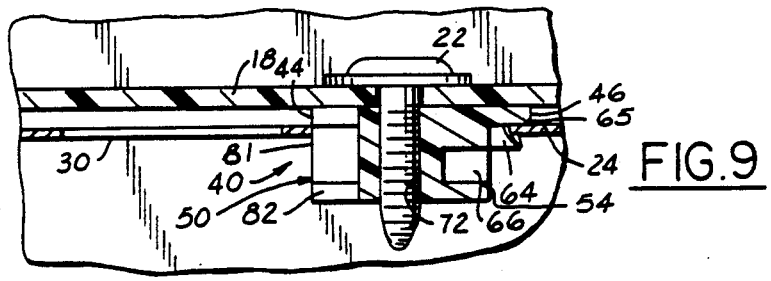
FIG. 9 is an enlarged fragmentary longitudinal sectional view of the attaching arrangement shown in FIG. 8.

As best seen in FIGS. 3 and 3A each of the keyhole shaped slots 26 comprise a leading wide slot portion 30 having a predetermined first width and a trailing narrow slot portion 32 having a predetermined second width. It will be noted in FIG. 3A that each keyhole-shaped slot 26 has parallel opposed edges and is symmetrical about a longitudinal axis 28'. The wide slot portion 30 is shown connected to the narrow slot portion 32 by lead-in sloped edges 34 while the closed end of the narrow slot is defined by transverse edge 36 and the closed end of the wide slot portion 30 is defined by transverse edge 38.

A plastic panel, such as the plastic fender 14, is made of urethane resin elastomeric material or the like which has thermal expansion and contraction rates substantially different from the metal substructure 23. Thus, a fastening arrangement is required that can be readily attached to a vehicle substructure that allows distortion free thermal growth and shrinkage of the plastic panel portion 18 relative to the metal substructure planar portion such as flange 24.

With reference to FIGS. 10 through 15 a fastening arrangement further comprises a plurality of plastic adjustable mounting blocks generally indicated at 40. Each of the mounting blocks is formed symmetrical about a longitudinal axis 41 and comprises an upper generally rectangular plate portion 42 defining a forward transverse leading edge 44 and aft trailing transverse edge 46. The plate portion 42 has longitudinal side edges 48 spaced at a predetermined width which a greater than the width of the wide slot portion 30.

Figures 13, 14, 15:
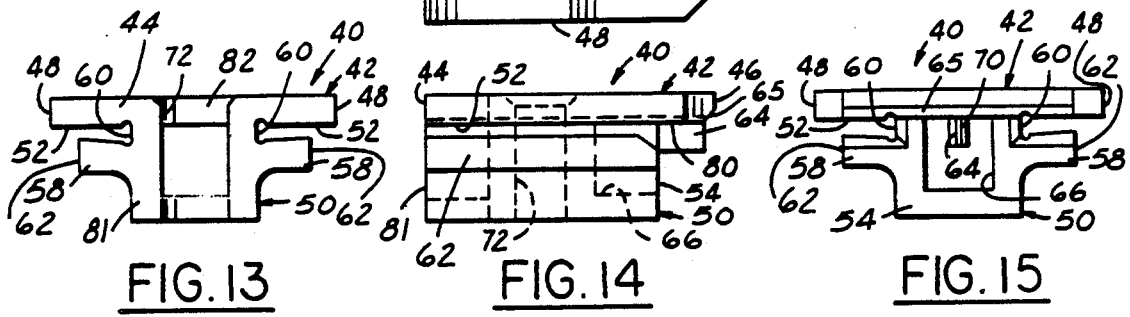
FIGS. 13, 14, and 15 are front, side and rear elevational detail views of the mounting block of the present invention.

The adjustable mounting block 40 has a central longitudinally extending rectangular abutment portion 50 depending from the undersurface 52 of the plate portion 42. As best seen in FIG. 14 the abutment portion 50 has its aft or trailing surface 54 longitudinally recessed or set back a predetermined distance from the plate portion trailing edge 46. The abutment portion 50 has sides 56 formed with a pair of laterally extending wing portions 58 vertically spaced from the plate portion undersurface 52 a predetermined distance so as to define therebetween a pair of opposed outwardly opening grooves 60.

As best seen in FIG. 5 the grooves 60 are adapted to slidably receive associated longitudinal edge portions of the narrow slot portion 32. It will be noted in FIGS. 7 and 8 that the width between free edges 62 of the pair of wing portions 58 is less than the width of the wide slot portion 30 and greater than the width of said narrow slot portion 32. Thus, as viewed in FIG. 3A the mounting block abutment portion 50 is initailly inserted in the wide slot portion 30 as the length of the abutment portion 50 is slightly less than the length of slot portion 30. It will be noted, however, that the sloped lead-in edges 34 provide additional longitudinal space for the ready insertion of the abutment portion 50. The mounting block 40 is subsequently moved longitudinally into the narrow slot portion 32 wherein the lead-in edges are slidably received in their associated grooves 60.

Figure 10:
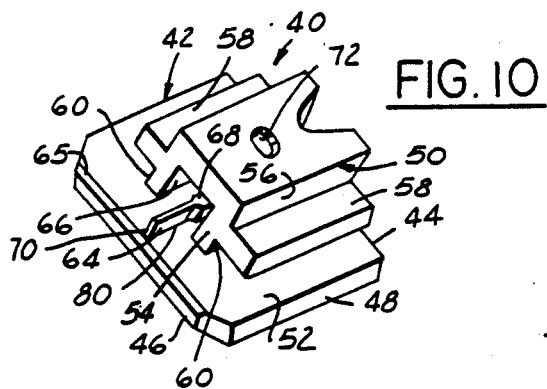
FIGS. 10 and 11 are detail perspective views of the plastic mounting block of the invention FIG. 9.

The mounting block 40 is longitudinally advanced into the narrow slot portion 32 to its installation position shown in FIGS. 4 and 7. As seen in FIG. 10 a vertically disposed central locating finger 64 is formed integral on the undersurface 52 of the plate portion 42 and extends longitudinally forwardly from the aft edge chamfer 65 (FIG. 14) 46 aligned in the vertical plane of symmetry which includes the axis 41 of FIG. 12. The abutment portion face 54 has a rectangular recess 66 formed therein into which the locating finger 64 extends.

With reference to FIG. 7 the locating finger is shown having a narrow or thin section 64 which is continuous with a thicker sectioned stem portion 68 within the recess 66. The locating finger 64 free end 70 is shown contacting the closed transverse edge 36 of the narrow slot portion 32 to position the mounting block 40 in its installation indexed position. It will be appreciated that in FIG. 7 each adjustable mounting blocks 40 of FIG. 1 is located at its indexed position in its associated keyhole-shaped slot 26 with each block through bore 72 aligned with its associated hole 20 in the subjacent substructure metal panel 24. The self-tapping screws 22 are next threadably inserted in each of the mounting block bores 72 and their aligned holes 20. Accordingly, when the anchoring screw 22' (FIG. 1) is inserted in its hole 20' and aligned reference hole 74 the fender's plastic panel portion 18 is precisely located on the vehicle substructure 23.

As the fender panel portion 18 is fixed at its rearmost end by the anchoring screw 22' in metal flange reference hole 74 the panel 18 is free to expand in a forward direction from the screw 22' to accommodate thermal distortion free growth relative to the metal substructure. Thus, as seen in FIG. 7, the adjustable mounting block abutment portion 50 is partially indicated in an expansion position by phantom lines. The block 40, in its phantom line position, has slidably traveled forwardly toward the wide slot portion 30 of its keyhole-shaped slot 26 relative to the substructure metal flange 24.

Upon the plastic panel portion 18 being subjected to a predetermined drop in temperature sufficient to cause contraction of the plastic material the panel will shrink rearwardly toward the anchor screw 22'. If shrinkage occurs with the adjustment blocks 40 in their index full line position of FIG. 7 applicant's invention results in the closed edge 36 of the metal flange 24 crushing the frangible plastic finger 64 by shearing or cutting the finger 64 at its longitudinal integral juncture 80 (FIGS.

10 and 14) with the undersurface 52 of the block plate portion 42. With reference to FIG. 8, as the plastic finger 64 is severed from the undersurface 52 progressive rearward longitudinal travel of each of the adjustment blocks 40 causes the severed portion of the finger 64 to yield and crush in an accordion fashion against the transverse edge end 36. Thus, the adjustable mounting blocks 40 uniquely accommodates longitudinal fore and aft thermal expansion and contraction of the plastic panel 18 relative to the metal flange 24.

Figure 11:
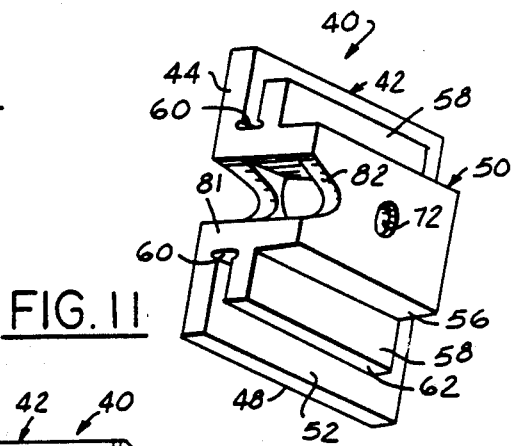
Figure 12:
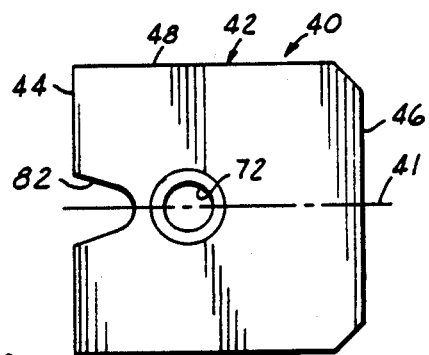
FIG. 12 is an enlarged top elevational detail view of the mounting block of FIGS. 10 and 11.

With reference to FIGS. 10, 11, and 12 it will be seen that the forward edge 44 and forward face 81 of the block abutment portion 50 have a radiused notch or cut-out 82 formed therein with outwardly or forwardly diverging side walls. Further, the block grooves 60, as seen in FIGS. 3 and 7, are each tapered toward the narrow slot portion 32 such that the entrances or aft ends of the grooves 60 at the aft face 54 are transversely deeper than the forward ends of the grooves at the forward face 81. The tapered grooves 60 insure a close snug fit of the blocks 40 in their associated narrow slot portions 32. Accordingly, the notch 82 provides resilient flexibility enabling the block 40 to flex laterally inwardly, if necessary, accommodating for any out of tolerence conditions between the grooves 60 and the keyhole narrow slot portion 32.

It will be further observed in FIG. 5 that the upper surfaces of the pair of wing portions 58 are sloped upwardly toward their outer ends to insure snug sliding reception of the narrow slot portion 32 within their associated grooves 60. With reference to FIG. 6 with the screw 22 fully driven home the wings upper surfaces are drawn-up flush with the underside of the metal flange 24.

An alternative embodiment of the present invention is shown by the plastic adjustable mounting block generally indicated at 90 in FIGS. 16-19 of the drawings. Identical or corresponding portions of the mounting block 90 will be indicated by the same numerals except that they will be primed. Accordingly, the mounting block 90 comprises an upper generally rectangular plate portion 42' defining a forward transverse leading edge 44' and an aft transverse trailing edge 46'. The plate portion 42' has longitudinal side edges 48' spaced at a predetermined width which is greater than the width of the wide slot portion 30.

The block 90 has a central longitudinally extending rectangular abutment portion 50' has its aft or trailing surface 54' longitudinally recessed a predetermined distance from the plate portion trailing edge 46'. The abutment portions 50' has sides 56' formed with a pair of laterally extending wing portions 58' vertically spaced from the plate portion undersurface 52' a predetermined distance so as to define therebetween a pair of opposed outwardly opening grooves 60'.

The grooves 60' are adapted to slidably receive associated longitudinal edge portions of the narrow slot portion 32 in the same manner as the first embodiment of FIGS. 1-15. It will be noted in FIG. 16 that the plate portion 42' forward edge 44' has a radiused notch or cut-out 82' to provide resilient flexibility enabling the block 90 to flex laterally inwardly, if necessary, accommodating for any out of tolerance conditions between the grooves 60' and the keyhole narrow slot portion 32.

Figure 16:
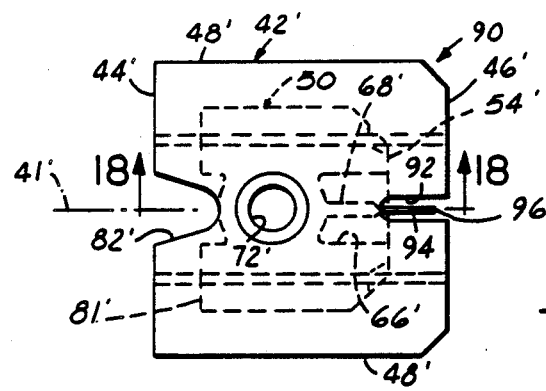
FIG. 16 is an enlarged top elevational detail view of a modification of the mounting block of FIG. 1-15.
Figure 17:
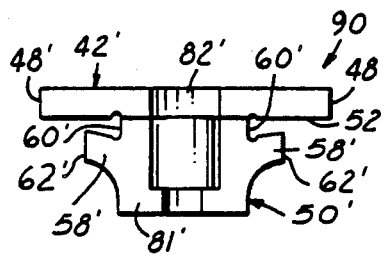
FIGS. 17, 18 and 19 are front, side and rear elevational detail views of the mounting block of FIG. 16.

It will be noted in FIG. 16 that the upper plate portion 42' has its aft edge 46' formed with a longitudinally extending U-shaped notch 92 formed symmetrical about the longitudinal axis of symmetry 41' of the block 90.

Thus, the block 90, which is formed with a vertically disposed thin central frangible locating finger 94, such that the frangible finger 94 is cantilevered rearwardly from its thicker sectioned stem portion 68'. This is in counterdistinction to the form of the invention shown in FIG. 10 wherein the finger 64 is formed with a longitudinal integral juncture 80 with the undersurface 52 of the block plate portion 42. The cantilevered finger 94 is shown in FIG. 16 coextensive with the notch 92 in its unbroken state. Consequently, the finger 94 is more readily crushed by the transverse one edge 36 of the narrow slot portion 32 with the block 90 sliding toward the edge 36 upon the fender panel portion undergoing thermal contraction such as during sub-zero temperatures. In its crushed state the finger 90 would be deformed in a manner similar to the crushed finger 64 shown in FIG. 8. It will be noted, therefore, that with all conditions of material and size being equal the cantilivered finger 94 may yield to its crushed state by a lesser compressive force than is required to crush the finger 64. It will also be noted that the U-shaped notch 92 provides visual indication to the installer that the cantilevered finger free aft edge 96 is abutting the flange transverse edge 36 to insure correct location of the block 90.

Figure 18:
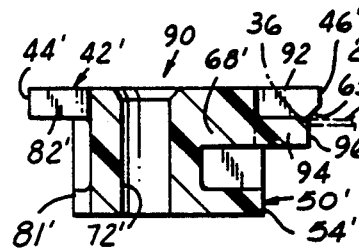
Figure 19:
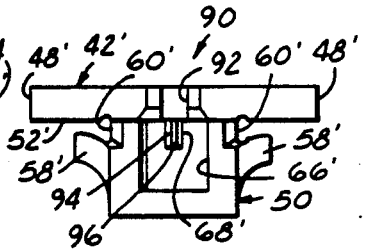

FIG. 18 shows the cantilevered finger 94 having its free end 96 recessed a slight distance from its trailing edge 46' so as to terminate at the lower edge of its aft edge chamfer 65'. Thus, by virtue of the locating finger 94 being cantilevered rearwardly, it provides increased weakness to a predetermined compressive force as compared to the locating finger 64 of the embodiment of FIGS. 1-15. That is, as the fingers 64 must be sheared from the plate portion undersurface 52 a predetermined greater compressive force is required to crush the finger 64 than is required to crush the cantilevered finger 94. The embodiment of FIGS. 16-19 allows the finger 94 to be more readily crushed by the transverse edge 36 of the keyhole-shaped slot 26 during shrinkage of the panel.

While preferred embodiments have been shown and described to illustrate the invention, other embodiments will become to those skilled in the art. Accordingly, the scope of his invention is set forth in the following claims.

What is claimed is:

1. A vehicle body panel structure comprising a metal substructure, a one-piece plastic panel formed with an integral elongated planar panel portion having outer and inner planar surfaces, said supported with its inner surface in spaced parallel relation with an elongated planar member of said substructure and said having thermal expansion and contraction rates substantially different from said metal substructure planar member, an attachment arrangement securing said to said metal substructure planar member;

said metal substructure planar member formed with a plurality of identical keyhole-shaped slots arranged in longitudinal alignment, each said slot defined by a leading wide slot portion having opposed longitudinal side edges spaced a predetermined first width and a trailing narrow slot portion having opposed longitudinal side edges spaced a predetermined second width, said narrow slot portion terminating in a transverse one edge and said wide slot portion terminating in an opposed transverse other edge;

a plastic mounting block for each said slot, each said mounting block sized for initial manual positioning in an associated wide slot portion for subsequent rearward travel into slidable guided assembly with said narrow slot longitudinal side edges;

each said mounting block formed symmetrical about a longitudinal axis comprising an upper generally rectangular plate portion defining forward and aft transverse ends and longitudinal sides, said plate portion sides spaced a predetermined width greater than said wide slot portion first width, said plate portion formed with a lower central box-shaped abutment portion depending from an undersurface thereof, said abutment portion having a transverse leading surface, a transverse trailing surface, and longitudinal side surfaces, said trailing surface recessed a predetermined longitudinal distance from said plate portion aft end;

said abutment portion side surfaces formed with a pair of laterally extending coextensive wing portions vertically spaced from said plate portion undersurface a predetermined distance to define therebetween a pair of opposite outwardly opening grooves, each said groove slidably receiving an associated one of said narrow slot portion side edges, each said block wing portion having a longitudinal free edge wherein the width between each mounting block pair of wing portion free edges is less than said wide slot portion first width and greater than said narrow slot portion second width;

each said mounting block plate portion undersurface being formed with a vertically disposed longitudinally extending central stem portion, each said central stem portion having a vertically disposed longitudinally extending frangible locating finger of predetermined thin section cantilevered rearwardly therefrom with each said locating finger terminating in a trailing free aft end, each said finger free aft end being positioned a predetermined distance beyond its associated abutment portion transverse surface and terminating just short of its associated plate portion aft end;

each said mounting block adapted for slidable assembly in its associated narrow slot portion to an initial position whereby each said finger trailing free aft edge abuts its associated narrow slot portion transverse one edge defining an angle therewith of substantially ninety degrees thereby positioning each said mounting block at a predetermined initial location on said metal substructure planar member;

a mounting block fastener extending through a fastening hole in said panel portion and an aligned central bore in an associated subjacent mounting block so as to fix each said mounting block plate portion in flush contact at a predetermined location relative to said panel portion inner planar surface, and aft fastening means fixing said panel portion at an aft portion thereof to said metal substructure planar portion;

whereby upon thermal contraction travel of said panel portion together with each of said mounting blocks in a fixed rearward longitudinal direction relative to said metal substructure planar portion causing each said narrow slot portion transverse one edge to apply a compressive thermal stress load on each said locating finger vertical trailing free aft end thereby permanently crushing a segment of said locating finger corresponding at least to the amount of thermal contraction travel undergone by said panel portion and said mounting blocks; and whereby as a result of each said locating finger having a segment thereof crushed by its associated narrow slot portion transverse one edge each said mounting block thereafter being free for reciprocal slidable movement longitudinally in its associated narrow slot portion relative to said metal substructure planar portion during subsequent thermal expansion and contraction longitudinal travel of said panel portion.

2. The attachment arrangement as set forth in claim 1, wherein lead-in chamfered converging edges are provided between said keyhole slot wide slot portion and said narrow slot portion.

* * * * *